(12) United States Patent
Zank et al.

(10) Patent No.: US 7,765,083 B2
(45) Date of Patent: Jul. 27, 2010

(54) METHOD AND APPARATUS FOR DETECTING SOURCES OF PROJECTILES

(75) Inventors: Paul A. Zank, Brookline, NH (US); Michael Mercier, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 249 days.

(21) Appl. No.: 10/593,922

(22) PCT Filed: Jun. 8, 2005

(86) PCT No.: PCT/US2005/020205

§ 371 (c)(1), (2), (4) Date: Sep. 24, 2007

(87) PCT Pub. No.: WO2006/093511

PCT Pub. Date: Sep. 8, 2006

(65) Prior Publication Data

US 2008/0167835 A1  Jul. 10, 2008

Related U.S. Application Data (63) Continuation-in-part of application No. 10/917,793, filed on Aug. 12, 2004, which is a continuation-in-part of application No. PCT/US03/04092, filed on Feb. 12, 2003.

(60) Provisional application No. 60/578,745, filed on Jun. 10, 2004.

(51) Int. Cl.
*G01C 17/00* (2006.01)
(52) U.S. Cl. ..................... 702/150
(58) Field of Classification Search .................. 702/150
See application file for complete search history.

(56) References Cited

U.S. PATENT DOCUMENTS

| 4,328,938 | A | * | 5/1982 | Reisman et al. | 244/3.1 |
| 5,384,458 | A | * | 1/1995 | Hilliard et al. | 250/227.17 |
| 6,239,747 | B1 | * | 5/2001 | Kaminski | 342/442 |
| 6,314,055 | B1 | * | 11/2001 | Foxlin et al. | 367/127 |

OTHER PUBLICATIONS

U.S. Appl. No. 60/587,745, filed Jun. 10, 2004.
U.S. Appl. No. 10/917,793, filed Aug. 12, 2004.
U.S. Appl. No. 60/640,465, filed Dec. 31, 2004.
U.S. Appl. No. 11/104,125, filed Apr. 12, 2005.

* cited by examiner

*Primary Examiner*—Aditya Bhat
(74) *Attorney, Agent, or Firm*—Daniel J. Long; Robert K. Tendler (57) ABSTRACT

What is provided is the use of an array of E-field sensors to detect the closest approach of incoming projectiles and to determine through time difference of arrival the bearing of the incoming projectile, thus to identify the bearing of the source of the projectile. dE/dT processing of the individual outputs of the E-field sensors indicates by the zero crossing the peak of the E-field disturbance and thus the instance of time of the closest approach of the projectiles to a sensor.

20 Claims, 11 Drawing Sheets

METHOD AND APPARATUS FOR DETECTING SOURCES OF PROJECTILES

RELATED APPLICATIONS

This Application claims rights under 35 USC §119(e) from U.S. Application Ser. No. 60/578,745 filed Jun. 10, 2004, entitled "Method and Apparatus for Detecting Sources of Projectiles," and is a continuation in part of U.S. patent application Ser. No. 10/917,793, filed Aug. 12, 2004, which is a continuation in part of PCT/US03/04092 filed Feb. 12, 2003, entitled "Method to Detect and Determine Bearing to a Rocket Launch or Muzzle Blast," the contents of which are incorporated herein by reference.

FIELD OF THE INVENTION

This invention relates to E-field sensors and more particularly to the use of E-field sensors in determining the trajectory of a projectile.

BACKGROUND OF THE INVENTION

It will be appreciated that a number of attempts have been made to determine the trajectory of an incoming round or bullet in order to be able to isolate the shooter and to provide what other measures are necessary in order to neutralize the threat. To do so, it has been the practice to deploy an array of acoustic sensors to acoustically sense the location of the source of an incoming projectile. This is usually done by detecting muzzle blast and the shock wave that attends it.

However, there are a number of problems involved in ascertaining the source of the projectile acoustically, mainly centering around the arrival of reverberations. Moreover, it is a practice of professional snipers to prefer subsonic rounds that acoustic methods do not detect. Additionally, in a firefight or when there are multiple rounds being fired, it is virtually impossible to detect which individual sound trails belong to which shooters. The result is that acoustic means are not particularly useful in identifying the shooter or his location.

There is also another problem associated with acoustic determination of the position of a projectile and that is the fact that the shock wave extends out from the forward portion of the projectile some distance behind it. Thus, the position of closest approach to an acoustic sensor is not easily ascertained. As a result, it is not easy to determine what part of the shock wave has been sensed in order to ascertain source location. This inability to specify closest approach impacts the time delay measurement between the sensors that is used to triangulate on the position of the projectile. A further problem with acoustic sensing is that the speed of sound plays a factor so that pinpointing a projectile and determining its trajectory is either delayed or requires a relatively large baseline for the acoustic array sensors.

This baseline in and of itself is problematic due to the large array configuration. It is unwieldy and very visible. For instance, when carried on a vehicle, the array extends above the vehicle and can be seen for hundreds of yards, making it easily avoidable by shooters.

Additionally, the large arrays such as acoustic arrays are not easily man-portable. When an individual attempts to erect an acoustic array, for instance in a foxhole, not only do the confines of the foxhole make deployment awkward, the presence of the individual is readily ascertainable due to the bulky array that is projected above the foxhole.

Not only is it important to be able to ascertain the trajectory of incoming fire from the point of view of the individual soldier, if one could mount a convenient device on a vehicle, one could at least tell the quadrant from which incoming fire is coming in so that one could bail out at the opposite side of the vehicle.

It will be appreciated that, with respect to the type of acoustic sensors that are vehicle mounted, the acoustic array is usually mounted on a pole over the top of the vehicle. The problem with the acoustic sensors, as mentioned above, is that the enemy quickly learns which ones to shoot at and which ones not to. Thus it is a requirement that whatever system is deployed, the one that has the lowest observability is preferred, so that the enemy does not know which vehicles or individuals are equipped and which are not.

As to aircraft, remotely controlled vehicles or unmanned aerial vehicles, UAVs, oftentimes are fired at by small arms fire, which disables them without the knowledge of ground controllers. Oftentimes the only time that a ground controller is aware that a UAV has been hit is by malfunction in the telemetry or in fact a ceasing of telemetry operations. The ground controller has no way of sensing incoming fire in order to have the aircraft take evasive action. It is for this reason that it is desirable to provide a lightweight, compact and extremely energy-stingy trajectory sensing system that is UAV-mountable.

By way of further background, it has been ascertained that the naturally occurring electric field surrounding a moving charged object is changed by the passage of the charged object through the electric field; and that this change can be sensed by a so-called E-field sensor. Such an E-field sensor is described in provisional U.S. Patent Application 60/640,465 filed Dec. 31, 2004 by Paul A. Zank, Eldon Sutphin, David Buchanan, and George Succi, entitled "Method and Apparatus for Detecting Individuals Using Electrical Field Sensors," assigned to the assignee hereof and incorporated herein by reference. The E-field sensor basically senses the change in the electric field due to a moving charged body and was originally used to detect the charged particles that result from rocket propulsion of a missile.

Moreover, as described in U.S. patent application Ser. No. 11/104,125 filed Apr. 12, 2005 by Paul A. Zank and Eugene S. Rubin, assigned to the assignee hereof and incorporated herein by reference, E-field sensors have been used to detect power lines in wire strike avoidance systems in which differential E-field sensors are used.

E-field sensors of the type described have also been used to isolate lightning strikes and have been used for other purposes.

SUMMARY OF INVENTION

Rather than using acoustic means to obtain the trajectory of an incoming projectile, in the subject invention an array of E-field sensors is used that senses the disturbance of the local E-field as the projectile approaches the sensor array. The output of each of the array sensors is processed to determine the zero crossing of the first partial derivative, $-dE/dT$, of the E-field sensor output voltage which marks the peak of the change in the E-field as the projectile comes into the closest proximity to the sensor. Pairs of sensors provide time-difference-of-arrival measurements based on the times associated with the passage of the projectile at a first and second E-field sensor in an array. An arc-2 tangent algorithm is used to develop the azimuth or bearing to the source of the projectile when a two-dimensional E-field sensor array is used; or if a three-dimensional array is used, the elevation of the trajectory. Various filtering techniques are used to cancel out the effect of local 60-cycle or 50-cycle fields generated by power lines; and an averaging process is used to average the four channels of information relating to four different bearing calculations for a best estimate of bearing. The system in one embodiment decides that the E-field disturbance is due to a projectile if the bearing lies within a standard deviation. If not, then it is determined that what was sensed is not a projectile.

Note that the arc-tan-2 function is a two-argument arc tangent used to resolve a full 360 degrees without having to perform any extra arithmetic calculations. Note also that the zero crossovers in each of the four channels specify the particular times of the closest approach of the projectile to the array element. Note in the subject invention there is no concept of absolute time but rather time differences.

One of the advantages of the subject E-field array is that it is range limited, such that in a firefight in which multiple shots are fired from many different locations, the system only responds to projectiles that are relatively close in to the E-field sensor array, while simply not seeing other projectiles. Thus there is usually only one bearing calculated, since other shorts are not close to the sensors.

While it is not a requirement that the projectile pass between the sensors in the array, the closest proximity to each of the elements can be ascertained even when the projectile is to one side or the other of the array, assuming it is not more than 15 feet away.

Moreover, the size of the array can be minimized due to the use of the E-field sensors. If the sensor array has elements at the corners of a square, the array need only be 16 inches on a side. Moreover, the E-field sensor detector, filtering, and processing can be accomplished in a compact module that is exceptionally lightweight, with the E-field sensor in essence being only a conductive pad on a substrate. Thus its extent is minimized to contribute to low observability.

As a result, the E-field sensors can be spaced apart, for instance, on the wingtips and nose and tail of a UAV, or can be provided on a small platform that may be conveniently raised above a foxhole by a soldier in the foxhole, with the system having a display of the direction of the incoming round. Knowing the general direction of the incoming fire, the soldier can pop up and fire a burst in that direction and either take out the shooter or cause the shooter to move.

Moreover, if needs a device to be used in a crowd of people, knowing the shooter's direction, one can shine a high intensity strobe light or high intensity dazzler at the shooter and only need an aiming accuracy of 10 to 15 degrees. The result is that the shooter is dazed due to the non-lethal countermeasure. Thus line fire in a crowd can be avoided.

Likewise on a vehicle, mounting of the subject system is quite a simple matter so that it is not readily observable. Because the accuracy is typically on the order of two to five degrees in terms of the bearing of the incoming round, it is quite easy to provide a display within the vehicle so that individuals within the vehicle can exit the vehicle or bail out in a direction opposite to the incoming round.

Moreover, with respect to UAVs, again it is a simple matter to mount an E-field array and attendant circuitry on the UAV. Because of the low power consumption of the E-field devices themselves and because of the particular filtering system to be described, which limits the amount of processing power necessary to eliminate clutter and the effects of power line E-field disturbances, it has been calculated that one could, on a simple four double-A battery configuration, operate for 24 hours. Power consumption for processing the incoming information and slewing a laser to illuminate the direction of the incoming round is reduced to a minimum to achieve the 24-hour limit. Thus, for instance, with an AK-47 firing about 10 rounds a second, one has about 100 milliseconds to do processing before the next round is on its way. Using a very low power processor, and noting that a human being cannot respond in a tenth of a second anyway, one can detect a bullet every minute. For 24 hours, this means that the system can detect and track 1,440 rounds on one battery charge.

As to accuracy, with a larger array, 90% of the time the error is less than 5 degrees and 50% of the time is less than 2 degrees. There are also occasions when all four of the calculated bearings are identical.

While it is possible to use differential E-field sensors in which the sensor itself comprises two E-field antennas, the outputs of which are differentially amplified, the single-ended sensor is preferred, with the dE/dT zero crossing providing an accurate time indication of the closest approach of a projectile. Moreover, the problems associated with acoustic sensors are completely eliminated by using the E-field sensor array, which is effective not only for subsonic rounds but also in the multiple shot environments. Thus individual shooters can be isolated from the multi-shot clutter due to the relatively short range at which the particular E-field sensors operate.

Having derived the trajectory of the incoming projectile, one can use this information to slew a laser either to eliminate the shooter or to provide a line on the ground to indicate the direction of the source of the projectile. One can also use the trajectory to initiate countermeasures, including the projection of projectiles in the direction of the shooter, or the use of the aforementioned dazzler that disorients the shooter. Additionally, lasers slewed along the sensed trajectory can be used as laser target designators. Note that any type of alarm or display may be used to indicate the direction of incoming rounds so that evasive action can be initiated.

In summary, what is provided is the use of an array of E-field sensors to detect the closest approach of incoming projectiles and to determine through time difference of arrival the bearing of the incoming projectile, thus to identify the bearing of the source of the projectile. dE/dT processing of the individual outputs of the E-field sensors indicates by the zero crossing the peak of the E-field disturbance and thus the instant of time of the closest approach of the projectile.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
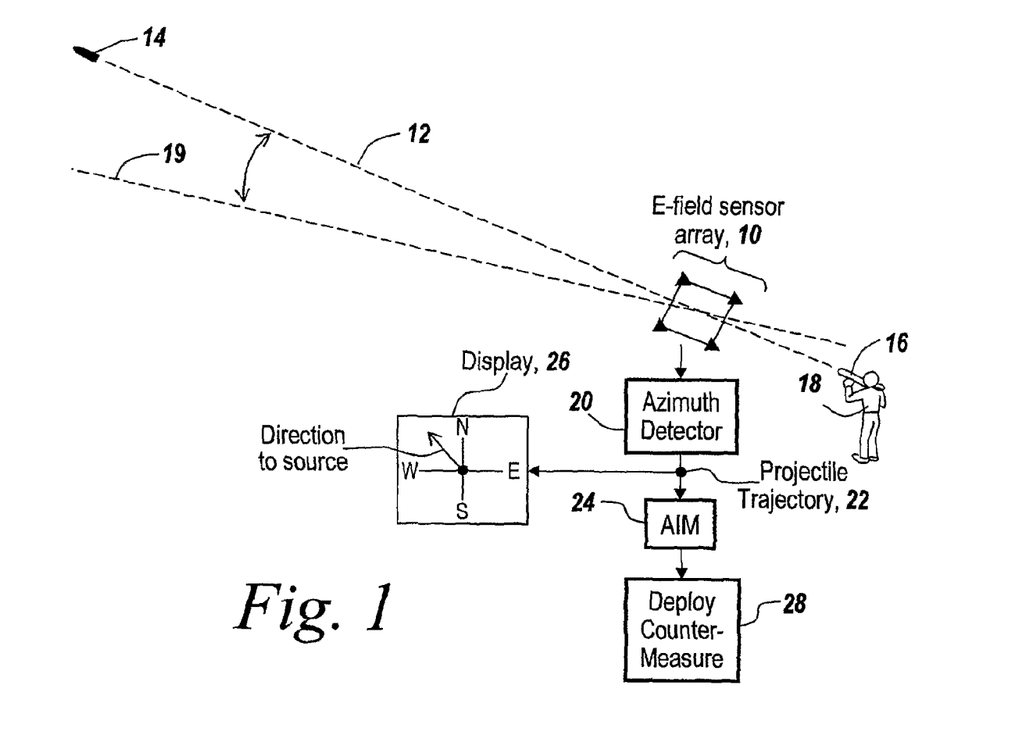
FIG. 1 is a diagrammatic illustration of an E-field sensor trajectory determination system in which an E-field sensor array is used to sense the passage of a projectile therethrough, with the bearing to a shooter being determined and displayed or used to aim a countermeasure that is to be deployed against the shooter.

As shown in FIG. 1, in the subject invention, an E-field sensor array 10 is used to detect the trajectory 12 of a projectile 14 as it passes near an E-field sensor, which projectile may be a bullet from a rifle 16 fired by an individual 18, with the trajectory measured from the E-field center line 19.

The disturbance in the local electric field caused by the passage of a charged projectile is detected by the E-field sensor array. The output of the array is coupled to a processing unit 20 that processes the output of the E-field sensors and outputs the projectile trajectory bearing 22. The bearing is either used to aim an ordnance illustrated at 24 or to display the direction to the source of the projectile as illustrated by display 26.

The aiming unit may be used to deploy any type of countermeasure, for instance such as the projection of a laser beam back to the source of the projectile. Additionally, the aiming unit may be used to aim a dazzler to disorient the individual firing the projectile. Countermeasures also include laser target illuminators that can illuminate the shooter, or may include directing fire towards the shooter from conventional weaponry as illustrated at 28.

Figure 2:
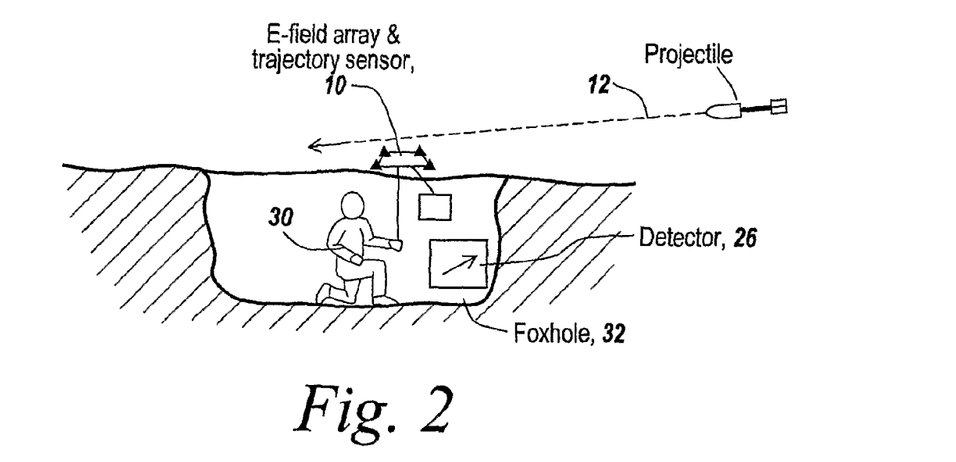
FIG. 2 is a diagrammatic illustration of the use of the E-field array trajectory sensing system used by a soldier in a foxhole in which the E-field sensor is extended above the foxhole and the direction of the shooter or projectile indicated to him in the foxhole.

There are various ways in which the E-field sensor trajectory sensing system may be utilized. As illustrated in FIG. 2, an individual 30 in a foxhole 32 may extend the E-field sensor array 10 above the foxhole to detect the trajectory 12 of a projectile passing over the foxhole. Individual 30 is provided with a display 26 of the trajectory so that he can reach up above the foxhole and spray bullets in the direction of the shooter. The advantage obviously is that with a small, almost undetectable device, the individual in the foxhole need not expose himself to enemy fire when determining the direction of the shooter but may momentarily deploy the E-field sensor array, find the trajectory or bearing to the shooter and take effective action.

Figure 3:
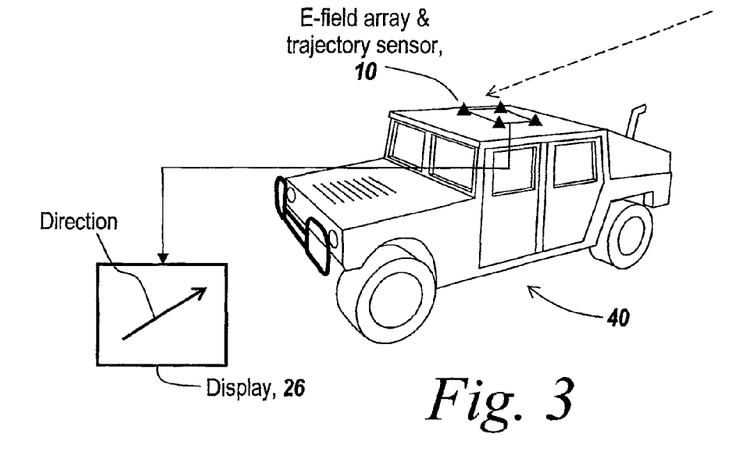
FIG. 3 is a diagrammatic illustration of the use of the E-field array trajectory sensing system used on top of a vehicle to display the direction of incoming fire or the bearing of the shooter.

As illustrated in FIG. 3, another important advantage of the E-field sensor trajectory detecting system is to locate the E-field sensor array 10 on a vehicle 40 such as Humvee. Since the E-field detector array has low visibility, it is often impossible for a shooter to determine which vehicle has an E-field sensor trajectory sensing system so as to be able to avoid it by shooting at another vehicle. The E-field trajectory-sensing system employed by a vehicle provides the bearing to or trajectory of the incoming round, as illustrated by display 26. Upon viewing the display, occupants in the vehicle can either direct fire or other countermeasures towards the shooter or can bail out of the vehicle at a quadrant opposite that of the incoming projectile. This allows the individuals to be able to use the vehicle as a shield against further incoming fire.

Figure 4:
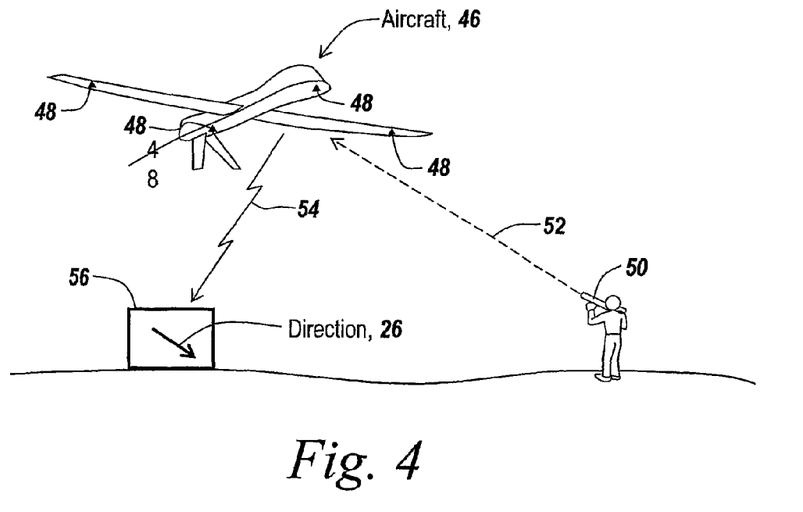
FIG. 4 is a diagrammatic illustration of the use of the E-field array trajectory sensing system aboard an aircraft in which the E-field sensors are spaced about the wings and body of the aircraft and in which the determined trajectory is transmitted to the ground controller of the aircraft.

Referring to FIG. 4, an aircraft 46, such as an unmanned aerial vehicle UAV, may be provided with E-field sensors 48 on the fuselage or on the wings of the UAV. A shooter 50, who is spraying bullets towards the aircraft along a trajectory 52, is detected by the E-field sensor array and attendant trajectory sensing system, which radios not only the existence of incoming fire but the direction of incoming fire, as illustrated at 54, to a ground controller 56, who has display 26 at his station. It is oftentimes the case that one does not know that a drone or a UVA is being fired at until the drone actually fails in some manner. It is oftentimes also not clear why the drone failed, whether it is due to hostile fire or to mechanical or electrical difficulties.

The subject system, therefore, when installed in a UAV, provides the ground controllers with the ability to first ascertain that hostile fire exists and secondly to take evasive maneuvers in order to avoid the hostile fire or, in fact, to deploy countermeasures to the shooter.

Figure 5:
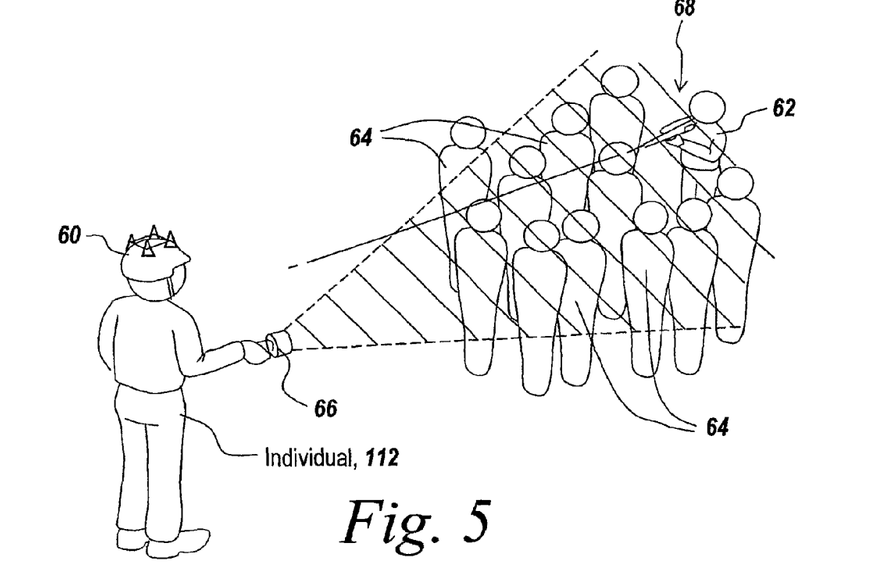
FIG. 5 is an illustration of a troop-carried E-field array trajectory sensing system in which the trajectory of the sensor is displayed to the troop and in which the troop aims a blinding light, called a dazzler, in the direction of the shooter to both illuminate the shooter and to temporarily disorient or blind him.

Referring to FIG. 5, the subject E-field sensor array trajectory sensing system may be deployed, for instance, on the helmet 60 of an individual 62 who, for instance, is deployed in security or crowd control. The trajectory sensing system of FIG. 1 is deployed on the individual's body and an indication is given to the individual of the direction of a shooter, here illustrated at 62 in a crowd of people 64. Individual 60 is provided with a dazzler 66, which is a pulsed, high-intensity light source that projects at beam 68 in the direction of the shooter 62, with the beam subtending an angle of approximately 15 degrees in one embodiment.

It is only necessary to have an accuracy of 15 degrees in order to be able to project a high-intensity light towards the shooter to cause the shooter to become disoriented. Also, the individual may carry a laser target designator, which can illuminate the shooter. It is noted that the use of the dazzler is important as a non-lethal means of countermeasuring the shooter in a crowd of people, since the dazzler does not employ lethal force but is merely used to disorient the shooter.

Figure 6:
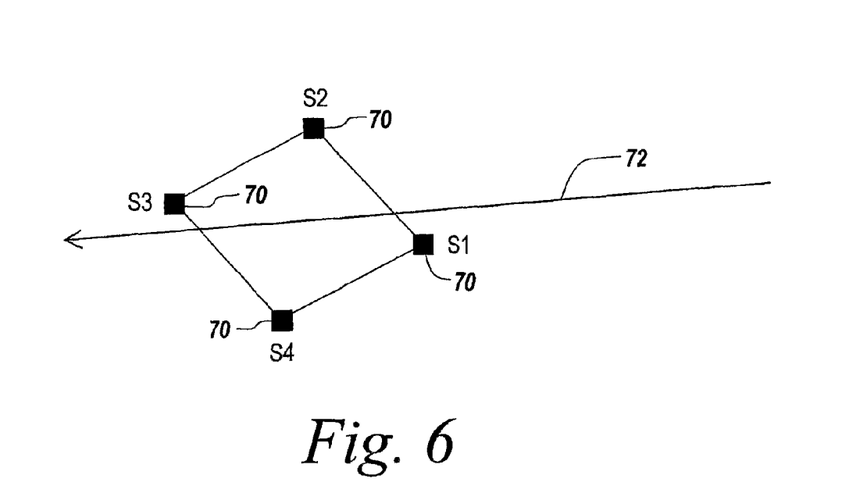
FIG. 6 is a diagrammatic illustration of the positioning of four sensors at the corners of a square, with three sensors being used to determine the trajectory of a projectile passing through the sensor array.

Referring now to FIG. 6, a rectilinear array of E-field sensors, here shown at 70, includes sensors $S_1$, $S_2$, $S_3$ and $S_4$ at various corners of a square. Using a square array simplifies the mathematics in determining the location of a projectile going along path 72 through the E-field sensor array. In one embodiment the spacing of the sensors is equidistant one from the other and is 16 inches to provide a 16-inch baseline.

Figure 7:
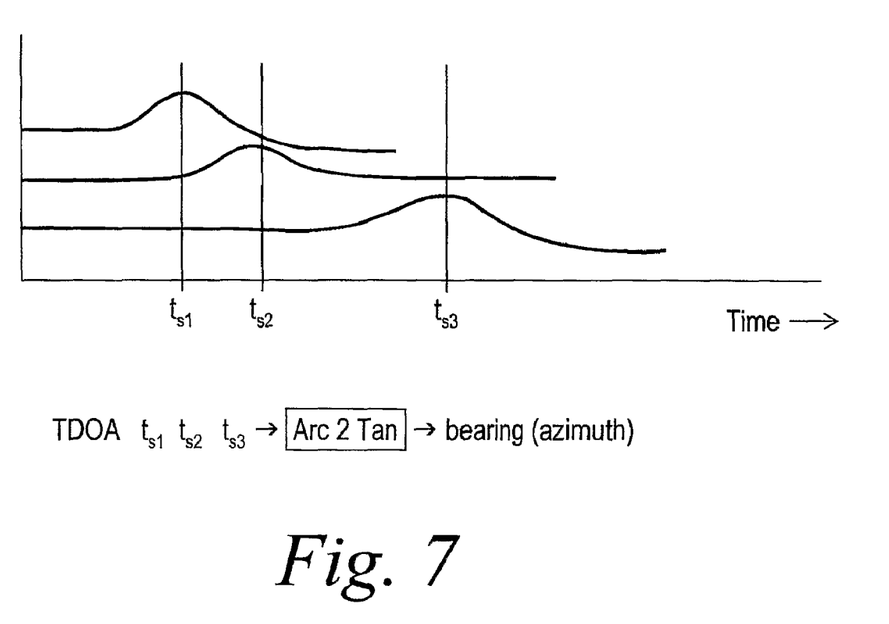
FIG. 7 is a graph showing the output waveforms of three of the four sensors, indicating that positive peaks in the changes of the E-field of the sensors occur at times $t_{S1}$, $t_{S2}$ and $t_{S3}$.

As illustrated in FIG. 7, the result of a charged projectile passing close to sensors $S_1$, $S_2$ and $S_3$ is that the E-field is disturbed at the point of closest approach of the charged projectile to the sensor. In this case, sensor $S_1$ has its E-field 74 disturbed such that a peak 76 occurs at time $T_{S1}$. Likewise, for sensor $S_2$ a peak 78 corresponding to disturbance 80 occurs at time $T_{S2}$. Additionally, at sensor $S_3$, a peak 82 occurs to disturb the E-field as illustrated at 84 at time $T_{S3}$.

Figure 8:
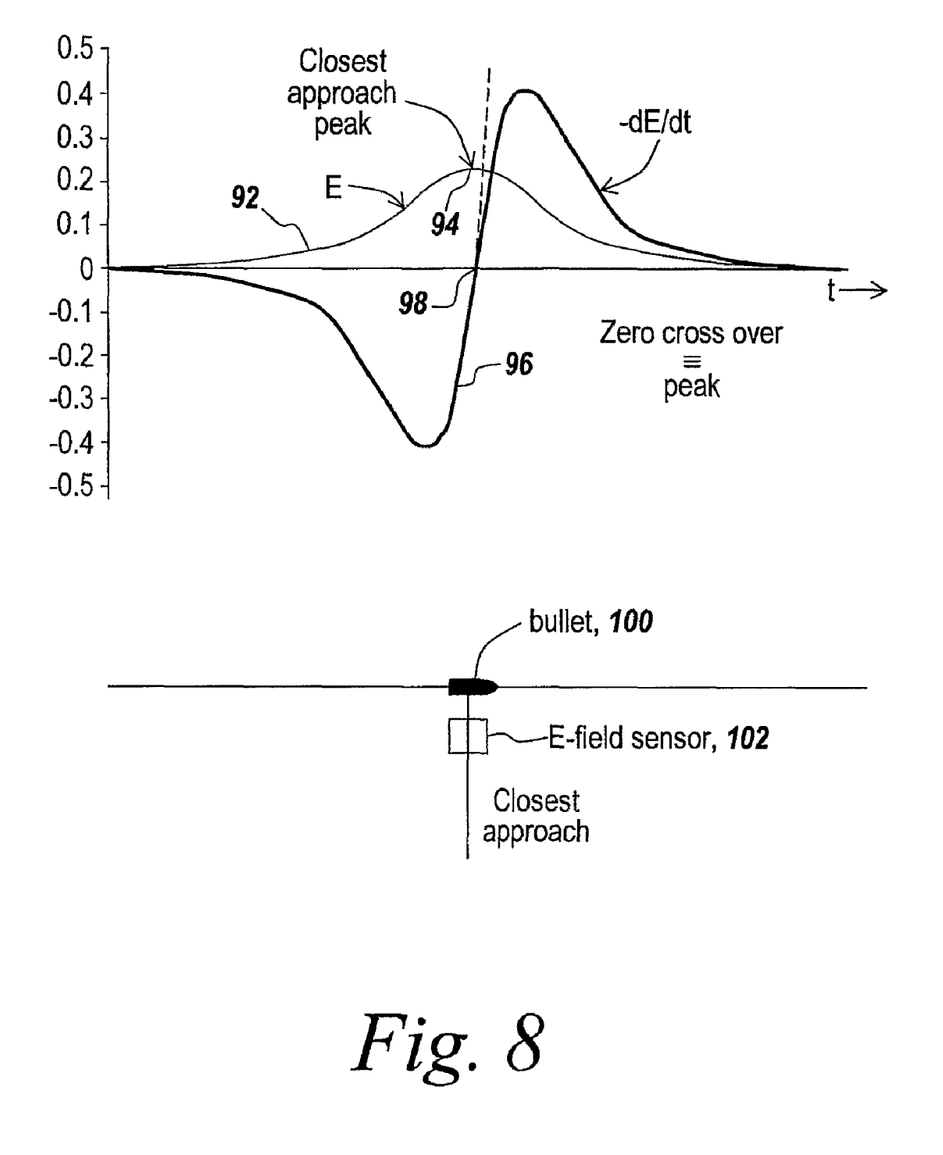
FIG. 8 is a diagrammatic illustration of the time difference of arrival of $t_{S1}$, $t_{S2}$ and $t_{S3}$ used as arguments in an arc-two tangent algorithm to provide bearing.

Referring to FIG. 8, As indicated in the time-difference-of-arrival system, these times of closest approach of a projectile are processed by an arc-2-tangent algorithm 90 having two arguments, the output of which being the bearing or azimuth. The arc-2-tangent algorithm is used as a simple method of determining bearing, which is good for 360 degrees.

Figure 9:
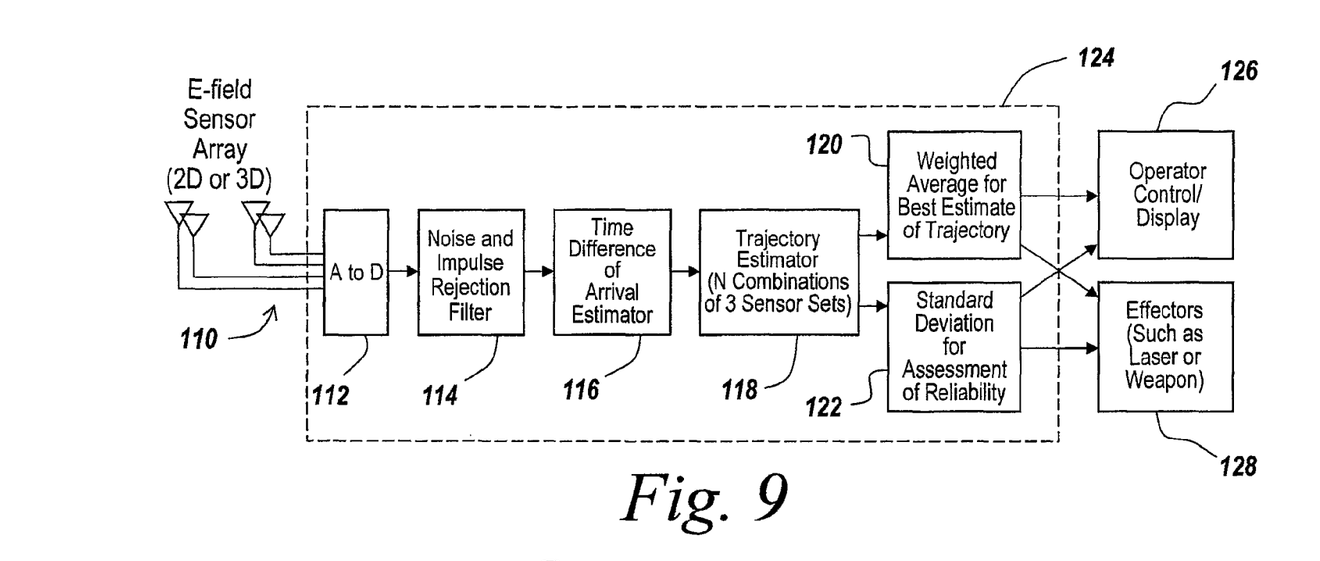
FIG. 9 is a diagrammatic illustration of the use of a first partial derivative of the electric field with respect to time, indicating that a zero crossover of $-dE/dT$ corresponds to the peak in the E-field due to the closest approach of the projectile or bullet to a sensor.

As illustrated in FIG. 9, it is possible to very accurately determine the time of closest approach by doing a –dE/dT calculation on the E-field sensor outputs. Here the E-field is shown at 92 to have a disturbance involving a peak 94 that corresponds exactly to the zero crossover of –dE/dT 96, as illustrated at 98. As can be seen, this corresponds to the closest approach of a bullet 100 to the associated E-field sensor 102. Thus peak detection is determined quite easily by using a first partial differential technique to process the E-field signals from the sensors to determine the zero crossing.

Note that having ascertained that a projectile traveling through the atmosphere exhibits either a positive charge or a negative charge, and noting further that the positive and negative charge disturbs the local electric field, it was ascertained that, by watching the time difference between the closest points of arrival of the projectile, one could compute the angle going back. Because of the use of the –dE/dT processing for the sensor, the point of closest approach provided the aforementioned zero crossing regardless of whether the bullet is either positively charged or negatively charged.

In a test of an AK-47 that discharged ten rounds, approximately 85 to 90% of the bullets passing by the E-field sensor were positively charged, about 1% were undetectable because there was no detectable charge, with the others being negatively charged. The polarity of the charge on the projectile does not matter in the –dE/dT detection system. It is sufficient that the projectile carry some charge regardless of its polarity.

As will be described, a single-ended E-field sensor is used that provides sufficient sensitivity.

While only three of the four sensors in a square array are used, the four sensors provide the ability to have four different channels from which to compute the trajectory. This means that there are four different zero crossovers or four different times, with combinations of the four different time differences between sensors providing the four channels of information.

Thus it is only a requirement that three sensors be used to compute the azimuths or bearing to a shooter, and this is done in one embodiment using an a-tan-two function, which is a two-argument arc tangent function. As mentioned before, this is used to resolve a full 360 degrees without having to perform any further arithmetic computations.

Note that up to this point the derivation of the trajectory has been discussed in terms of simple time differences. However, there is a factor that relates to the spacing between the E-field sensors. For a square array where all distances are equal, there are no additional factors. However, if the array is rectangular, the distances between selected pairs are different. However, as will be seen hereinafter, the equations used to compute trajectory take into account the differences in the distances between the pairs of sensors.

Figure 10:
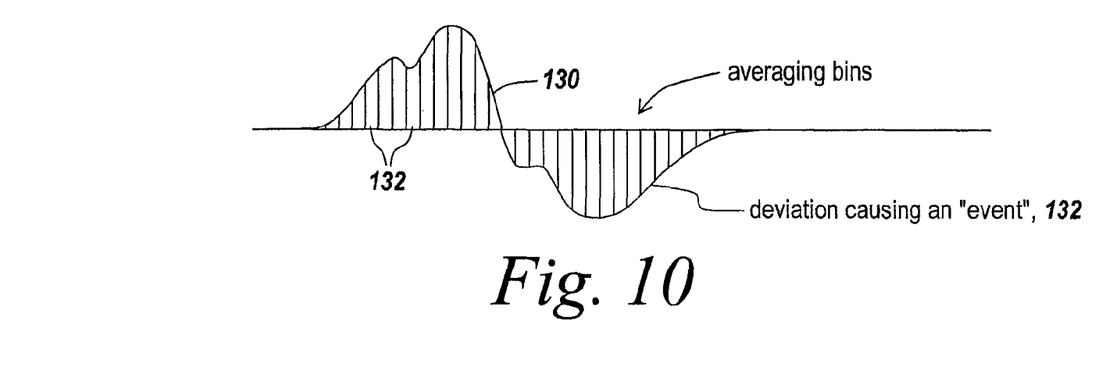
FIG. 10 is a diagrammatic illustration of the E-field sensor projectile trajectory tracking system, illustrating the use of a 2D or 3D E-field sensor array and a microchip processor having analog-to-digital converter, a noise and impulse rejection filter, a time-difference-of-arrival estimator, trajectory estimator, weighted averaging and standard deviation functions outputted to either an operator control/display or effectors such as a laser or weapon, also illustrating averaging bins used to permit detection of a low-level event.

Referring to FIG. 10, a two- or three-D E-field sensor array 110 is coupled to an analog-to-digital converter 112 that is in turn coupled to a noise- and impulse-rejection filter 114. The output of the noise- and impulse-rejection filter is coupled to a time-difference-of-arrival estimator 116, which is then used in a trajectory estimator 118 capable of handling n combinations of three-sensor sets.

Since in one embodiment of the subject invention four independent calculations are made of trajectory, a weighted averaging unit 120 takes the weighted average of the four calculated trajectories to obtain a best estimate of the trajectory. The trajectory estimator output is also supplied to a standard deviation unit 122 that uses the standard deviation as an assessment of reliability. Units 112-122 are conveniently available in a microchip processor in the form of microcontroller model PIC 18F 2525 manufactured by PIC.

The output of the microcontroller, here illustrated at 124, can be used to drive an operator control/display 126 or can be used to actuate effectors 128, such as lasers or other weapons, either to be able to lay down a laser line to the shooter or to direct countermeasures towards the shooter as described hereinbefore.

In one embodiment the system samples each one of the four channels 1,000 times a second. In order to obtain a better signal-to-noise ratio, a 16-bin noise filter is used to filter out the effects of power line-induced AC noise. The filter is used to get rid of the local power electric field, with the filter having 16 separate bins.

It has been determined that the E-field from the local power distribution network is not a clean sine wave and almost never is. In general it is usually some complex waveform that repeats 60 times a second for the United States or 50 times a second for the remainder of the world.

What the subject software accomplishes is to oversample the 60-Hz E-field and record 16 different bins of information throughout one cycle of the power phase. The 16-bin filter actually keeps a running average in each bin.

The reason to maintain a running average in each bin is that one can detect a very small change in each bin. This is illustrated by waveform 130, which is divided up in to bins 132. In each of the bins is the average over a number of cycles, with waveform 130 being the average E-field change due to power line-induced E-field changes.

Having a storehouse of these 16 bins, one can detect a deviation, as illustrated at 132, caused by some kind of event. This event can actually be a very small change in the E-field that would ordinarily be masked by the variation in the E-field caused by the non-uniform sine wave of the power grid.

For instance, if in four or five cycles in the past there has not been any change in the average for a bin, but in a subsequent cycle there is a change in that bin, one switches to a mode whereby one starts saving all of the data. In one embodiment one saves 128 samples of each channel at about one sample per millisecond.

If it turns out that one declares an event, one then has to determine whether it is a projectile going by, such as a round or bullet. To do this, one then takes the data that has been stored and looks for a maximum and a minimum. The system then finds two points that are one above the zero crossing and one below and interpolates between the two points to get a best estimate of the zero crossing.

If one had attempted to utilize a window or a thresholding technique to detect the presence of a projectile, one would have to set the threshold above and below the peak of the local grid-induced E-field variations, meaning that relatively small events would never be detected.

Thus the subject filtering system provides an enhanced signal-to-noise ratio such that one can trigger on much smaller events. It is noted that the threshold for each one of the averaging bins is much, much smaller than that which would be appropriate for the overall waveform.

It will be appreciated that, since one is keeping running averages of the levels in the 16 bins, an event is determined when a current analog-to-digital sample on a channel is different from what has been seen in the past.

Note that once an event has been signaled by an event in one of the 16 bins, the system stores away 128 samples per channel. Noting that there are four channels, this means that the 128 samples are stored for each one of the four samples. Since the particular microchip employed operates at 6 million instructions per second, one can get rid of the 60-Hz background even though it is a complex waveform, as long as the irregularity occurs every cycle, which it does. Although the TDOA techniques described above are complex, the subject computer can nonetheless do the processing in real time.

Moreover, it has been found that, using the E-field sensor system, one can detect a bullet every minute with low power drain such that for 24 hours one can use four double-A batteries, due to the fact of using a very low-power processor such as the PIC microchip processor.

Once having detected an event and once having used all of the information to detect the zero crossovers, one obtains four sets of times of arrival using four combinations of three sensors. Time-difference-of-arrival estimator 116 provides the estimates of the zero crossing and therefore the time estimates for each of the four sets of data. These four sets of data are used in the trajectory estimator 118 to obtain four independent estimations of angle of arrival using the aforementioned arc-2-tangent algorithms. Having derived four trajectories one obtains a best estimate of the actual trajectory using averaging techniques as illustrated at 120. In one embodiment this is a straight average of all of the four channels.

Simultaneously, each of the four angles of arrival is supplied to a standard deviation process for assessment of reliability. The standard deviation process looks at the standard deviation between these angles to see if it exceeds an arbitrary threshold. The threshold is usually set fairly tight such that the standard deviation cannot be more than four or five degrees to ascertain that what has passed by the E-field sensors is in fact a projectile or bullet. If the standard deviation is more than four or five degrees, the system determines that it does not know what caused the fluctuation in the E-field sensor array.

If the standard deviation is smaller than the threshold set, it is declared that the cause of the disturbance is a bullet or projectile because all of the complex time-difference-of-arrival calculations worked out sufficiently similarly. What this means is that the trajectory calculation, having been done four separate times, came up with the solution estimate in four separate ways. With such a unanimity of agreement between the four separate calculations of trajectory, one feels confident that one can turn on one of the effectors as illustrated at 128 or send the information to an operator display.

More particularly, if one labels the sensors A, B, C and D, assuming all of the distances between the sensors are identical, one can estimate the time of arrival by taking the difference in time between Time A and Time B, which constitutes the first argument for the arc-tan-2 algorithm. One then takes the time difference between Time A and Time C, which is the second part of an arc-tan-2 algorithm. The result is an angle corresponding to bearing.

Note that in one embodiment one has four sensors such that there are actually four different ways to pick three sensors. If one had redundant sensors, for instance, six, one might mount six sensors on a vehicle in the case that, if some of them are shot out or incapacitated by lightning hits, one still has a number of combinations by which one can determine the presence and bearing of an incoming round. One might, with five sensors, have 20 different sets of time differences. However, for four sensors one basically has four different tries or ways to calculate angle of arrival.

Note that unit 120 is capable of doing a straight average, but the unit is also capable of providing weighted averages. One can do a weighting by giving higher weights to those E-field sensors that have a higher signal-to-noise ratio. These sensors are going to yield a better estimate of angle of arrival and one weights them appropriately depending on how much power is received in each channel. Thus the weighted average provides a better guess as to the angle of arrival.

As to the size of the array, experiments have been made on arrays that are 26 inches on a side as well as the one described above, which is 16 inches on a side.

The larger the array, the greater the angular resolution. Clock accuracy assuming no phase jitter is not a problem. However, phase jitter presents certain errors. In practice, on the larger array, 90% of the time the error is less than 5 degrees and 50% of the time it is less than 2 degrees. There are also occasions when all four answers are identical.

Figure 11:
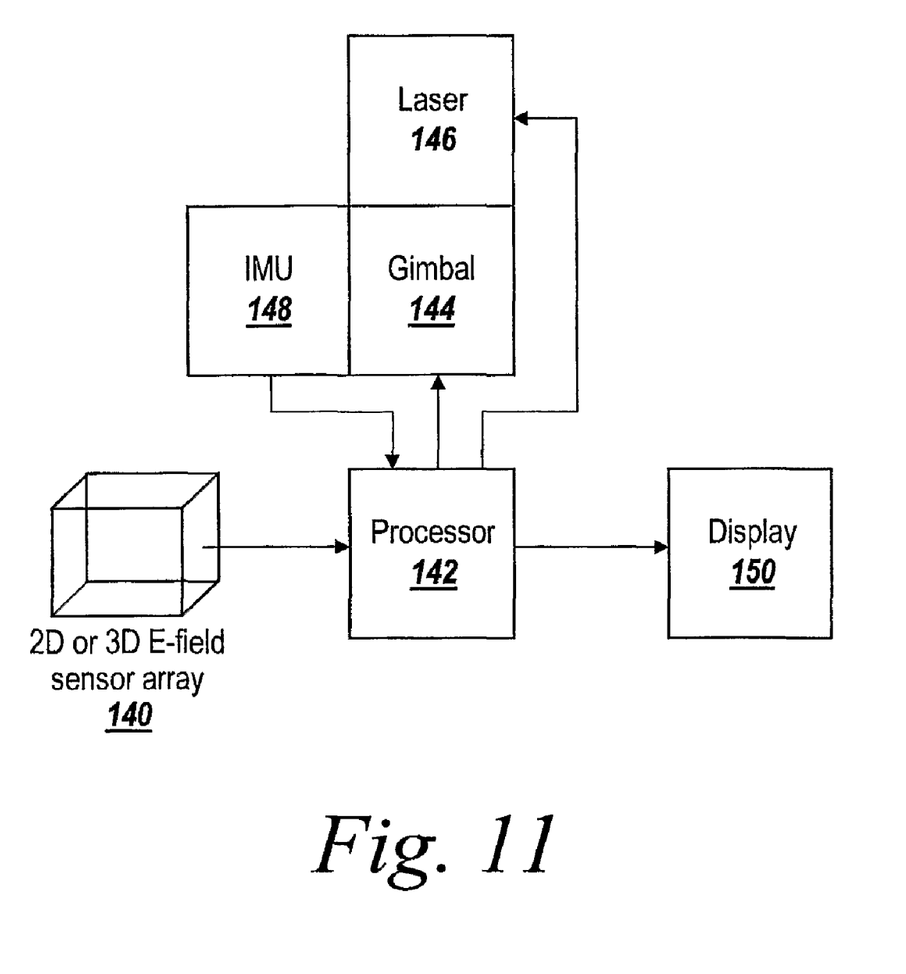
FIG. 11 is a block diagram of the use of a two- or three-field sensor array with a processor to gimbal a laser onto the source of a projectile and to display a trajectory.

Referring now to FIG. 11, a 2D or 3D E-field sensor array 140 may be coupled to a processor 142 of the type described, which in turn drives a gimbal 144 in accordance with the detected trajectory to aim a laser 146, with an IMU 148 coupled to processor 142 to establish the direction of the gimbal and thus the laser. Processor 142 also outputs a trajectory to display 150 to complete a practical system.

A program listing in C is presented in the Appendix hereto that describes the processing performed by processor 142.

Figure 12:
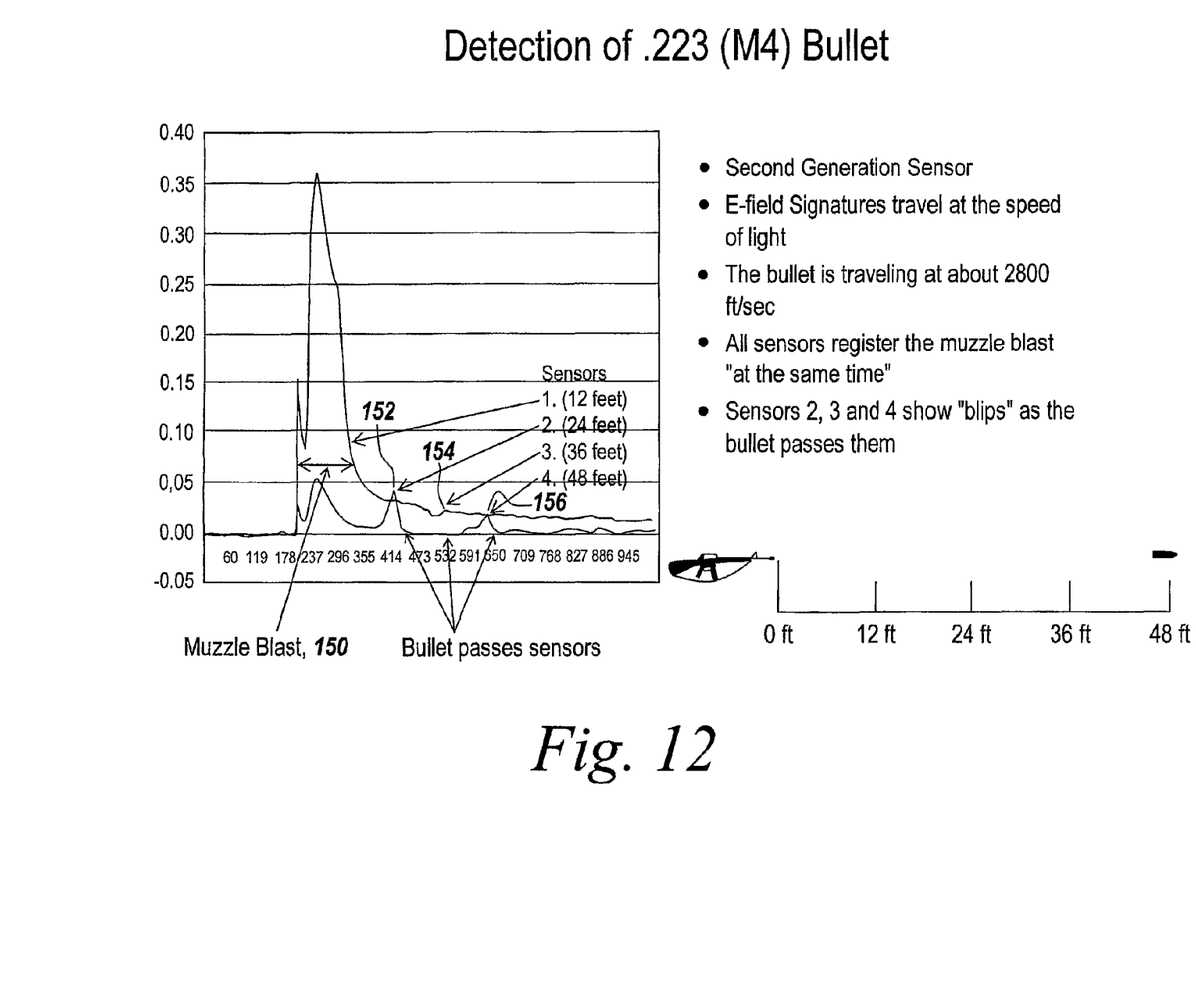
FIG. 12 is a graph showing the detection of a 0.233 M4 bullet as it passes by three of four E-field sensors in an array, illustrating peaks corresponding to the closest passage of a bullet to an individual sensor, noting E-field signatures travel at the speed of light, with the bullet traveling 2800 feet per second and with all sensors registering the muzzle blast at the same time.

Referring to FIG. 12, what is seen is a graph of the detection of a 0.233 M4 bullet from the position established by muzzle blast to the times where the bullet passes by three sensors. Here it can be seen that the muzzle blast 150 is detected simultaneously by four different sensors. Various peaks 152, 154 and 156 are detected respectively at sensors that are 24, 36 and 48 feet away from the point at which the projectile is fired. What this shows is that it is possible to in fact detect E-field changes with the passage of a bullet past an E-field sensor, noting of course that the E-field signatures travel at the speed of light, that the bullet is traveling at about 2800 feet per second.

Figure 13:
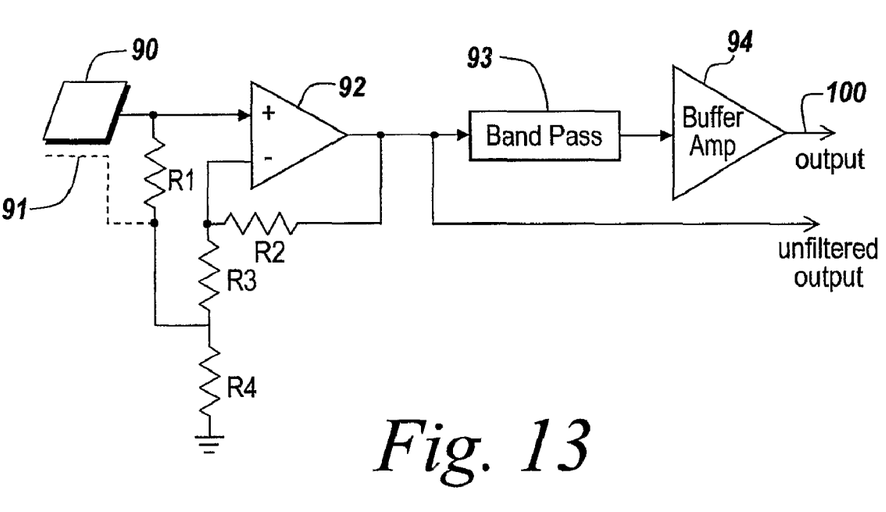
FIG. 13 is a block diagram of the single-ended E-field sensor used in the subject system.

FIG. 13 is a block diagram representing a simple embodiment of a sensor used for detecting E-field distortions, illustrating the circuit arrangement as well as the interconnection of the inputs and outputs. The sensing area 190 or "antenna" is a small conductive element.

The sensor area 190 in FIG. 13 can essentially be regarded as one side of a capacitor with the remainder of the sensor being the charged source or even the earth's field being the source. The larger the area the greater the sensitivity, however interference and extraneous signals become problematic if the sensitivity is too high. In one embodiment the pad is approximately 1/30 inch squared and picks up signals as low as 200 microvolts. Experimentation of other sensing areas from about 1/10 of a square inch to several inches has resulted in different data measurements and the size of the antenna depends upon the application and environmental conditions.

There is a guard area 191 proximate the sensing element that functions to reduce the "capacitance." In one embodiment where the circuit is laid out on a printed circuit board, the guard area is a wiring board etch on the opposite side of printed circuit board opposing the sensing area 190. The guard 191 primarily eliminates the capacitance of the shield, such as coax cable, thereby greatly increasing the antenna 190 impedance. In one embodiment the sensing element 190 is designed for maximum input impedance with a partial Faraday shield covering a portion of the sensing area 90 to reduce the gain.

Thus, the size of the sensor area 190 is one method to adjust system gain, while another adjustment mechanism is the shielding. Subsequent signal processing and filtering is used to reject unwanted signals, for example, narrow pulses or relatively high frequency signals such as those caused by lightning, arc welders, and RF sources.

A differential amplifier 192 is used with bootstrapping to establish high impedance and provide amplification. The gain of the differential amplifier 192 is determined by the resistors R2, R3, and R4 and as is well known in the art, that the gain is equal to (R2+R3+R4)/(R3+R4). The resistors R3 and R4 determine the percentage of input signal that is coupled to one side of R1 and the guard 191. For example, R3=1 k and R4=9 k, the voltage at the junction of R3 and R4 is 90% of the voltage at the sensing area 190. In effect, R1 appears ten times larger, and the capacitance of the sensing area 190 to be ten times lower.

Expressed differently, if the voltage at junction 191 were 99.9% of that present at the sensing area 190, the R3 would appear 1000 times larger and the capacitance of the sensing area 190 would appear to be 1000 times smaller. Thus the ratio of R3 to R4 determines the input resistance to the amplifier 192. It is preferred to make the input impedance very high without having amplifier 192 saturate due to its input bias currents. Typical feedback ratios are from 90% to 99% while the value of R1 might be 10 Mohms, giving an effective input resistance of 100 to 1000 Mohms or more.

Note that the output of amplifier 192 is coupled to a bandpass filter 193 that is in turn coupled to a buffer amplifier 194 having a filtered output 196 with an unfiltered output being available as the output of amplifier 192.

Figure 14:
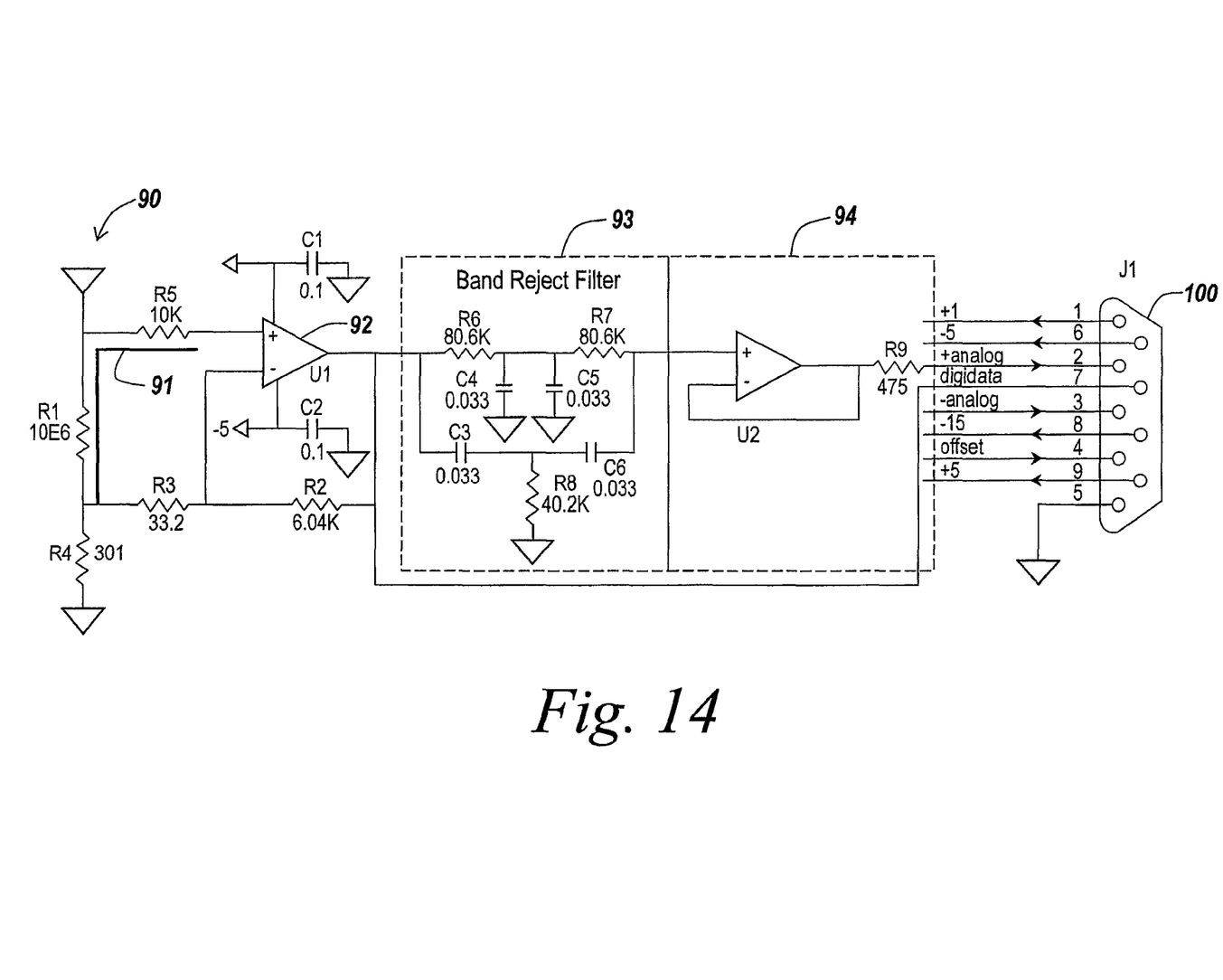
FIG. 14 is a schematic diagram of the E-field sensing system of FIG. 13; and, FIG. 15 is a flow chart of the program used by the processor of FIG. 11.

Referring to FIG. 14, in a preferred embodiment, the differential amplifier 192 is a field-effect operational amplifier U1 (op amp TLC2272) with bootstrapping to provide high impedance for the sensing element 190. In this circuit, the sensing element 190 is a small metallic piece that is part of the printed wiring board, such as an etch on the board. The sensing element signal is amplified and converted to a low source impedance. R1 is 10 Mohm, R2 is 6.04 Kohm, R3 is 33.2 ohm and R4 is 301 ohm. An additional resistor R5 may be connected between the sensing area 190 and the +input of the differential amplifier 192 of approximately 10 Kohm to provide amplifier protection.

A frequency filter 193 may be used in other applications when not looking to detect power lines. In this case filter 193 is a power line 60-Hz pass band filter used to pass the E field caused by power lines and is set to the power line frequency for the region of use, generally 60 Hz in the United States. In one embodiment, off-the-shelf commercial components are utilized to construct the filter 193. The 60-Hz pass band filter 193 is inserted to reject out-of-band signals.

A buffer amplifier 194 provides high input impedance to the filter 193 while providing additional gain and a low impedance source for the voltage-measuring device. Typically the measuring device is a sample-and-hold circuit followed by an analog-to-digital (A/D) converter and subsequent processing circuitry.

The buffer amplifier stage 194 in one embodiment is a second field-effect operational amplifier U2 (op amp TLC2272) and is used to achieve an approximate gain of 20 dB. A 15v DC power is supplied by a power source, such as common dry cell batteries, although any power source with acceptable output may be used. The output signal of the sensor device is delivered to the next stage of the detection system.

The sensor does not require unique components and persons skilled in the art will choose components that will enable optimal configuration to achieve the objectives of the sensor's application. The combination of the sensing elements and guard in conjunction with the bootstrapped differential amplifier and other elements enables the unexpected sensing of electric field disturbances in a wide array of applications.

Figure 15:
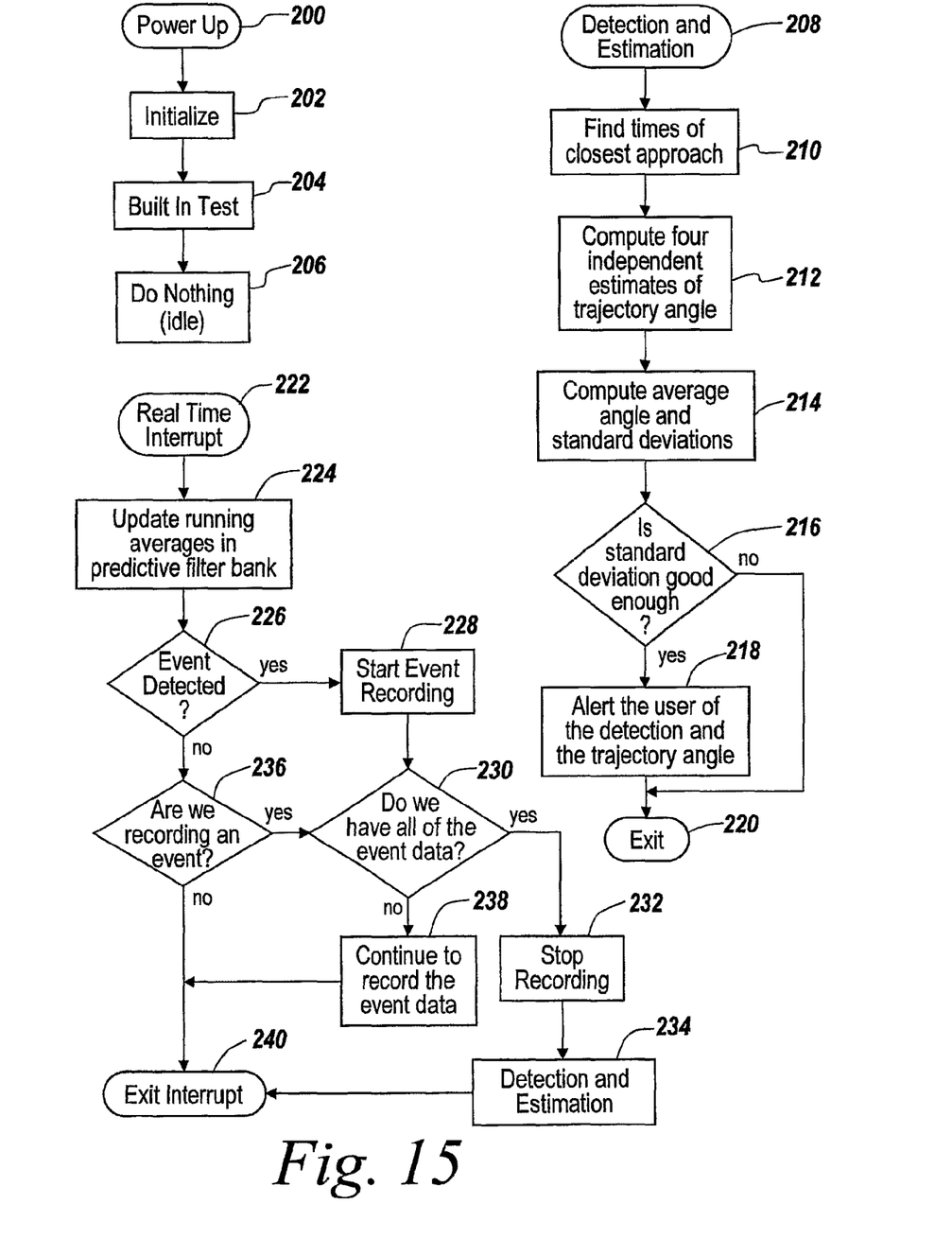

Referring now to FIG. 15, a flow chart for the aforementioned program listing associated with processor 142 of FIG. 11 is now presented. As can be seen at 200, upon power-up the processor is initialized as illustrated at 202, followed by a built-in test as illustrated at 204, after which the system is put in idle as illustrated at 206.

As illustrated at 208, during a runtime operation a detection and estimation step is followed, as illustrated at 210 by finding the times of closest approach to each of the sensors.

As illustrated at 212, the processor computes four independent estimates of trajectory angle, and as illustrated at 214, computes the average angle and standard deviations mentioned above.

As illustrated at 216, the system determines whether or not the standard deviation is good enough, meaning that the averaged angles are within the predetermined standard deviation set. If the average angles are within the standard deviation set, then as illustrated at 218 the user is alerted to the detection of an incoming round and its trajectory angle. If the standard deviation is not good enough, meaning that the average angles lie outside the standard deviation set, then the system exits this portion of the routine as illustrated at 220.

As illustrated at 222, a realtime interrupt results in updating running averages in the predictive filter bank as illustrated at 224.

As illustrated at 226, if an event is detected the system starts event recording as illustrated at 228. As illustrated at 230, a determination is made as to whether the system has all of the event data, and if so, as illustrated at 232, the recording is stopped. Upon the stopping of the recording as illustrated at 234, detection and estimation algorithms are invoked.

If an event is not detected, then as illustrated at 236 a decision is made as to whether the system is recording an event or not. If the recording contains event data, then as illustrated at 230 the system then determines again if one has all of the event data. As illustrated at 238, assuming one is recording an event, if one does not have all of the event data, the system continues to record. If on the other hand the system has determined that one is not recording an event, then an exit interrupt 240 is invoked.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for detecting the direction of an incoming round, comprising the steps of:
   deploying an electric field sensor array having individual electric field sensors that sense the local static electric field about the sensor;
   using electric field sensors to sense a change in the local static electric field at the sensor caused by the incoming round;
   determining the time difference of arrival of the round by sensing maximum change in the static electric field adjacent each of said electric field sensors in the array; and,
   computing angle of arrival from the time differences.

2. The method of claim 1, wherein the time-difference-of-arrival determining step includes detecting the zero crossover of the signals from each of the sensors to detect the time of closest approach of the round to the sensor.

3. The method of claim 2, wherein the zero crossover is determined by a first partial derivative of dE/dT for each electric field sensor.

4. The method of claim 1, wherein the electric field sensors are located on the corners of a rectilinear shape.

5. The method of claim 4, wherein the rectilinear shape is a square.

6. The method of claim 4, wherein the step of computing angle of arrival includes using an arc-tan-2 function, with selected electric field sensor pair time differences of arrival used as the arguments for the arc-tan-2 function.

7. The method of claim 1, and further including the step of filtering the outputs of the electric field sensors to remove electric field disturbances due to the local power line fields.

8. The method of claim 7, wherein the filtering step includes providing a plurality of bins for accumulating the output of the associated electric field sensor, with the bins dividing up the AC power line cycle and providing an average value for each bin over a number of cycles, with a predetermined variation in a bin from the, average value being declared an event not due to power line-induced electric field changes.

9. The method of claim 8, and further including the step of storing all of the electric field outputs after a declared event.

10. The method of claim 9, wherein the angle of arrival is computed from the stored outputs associated with a declared event.

11. The method of claim 10, wherein the time difference of arrival between pairs of electric field sensors is computed from the stored outputs.

12. The method of claim 1, wherein separate angle of arrival computations are made for different pairs of electric field sensors.

13. The method of claim 12 and further including determining the standard deviation for each computed angle of arrival and for declaring the passage of a round, when the computed angle of arrival is less than the standard deviation.

14. The method of claim 13, wherein the computed angles of arrival for each pair are averaged prior to comparison with the standard deviation.

15. The method of claim 1, wherein the direction of an incoming round is used for applications selected from the group consisting of man-carried electric field sensors, land vehicle-carried electric field sensors and aircraft-carried electric field sensors.

16. Apparatus for detecting the direction of an incoming round, comprising:
   an array of individual sensors, each having an output that detects the local static electric field threat; and,
   a processor coupled to each electric field sensor to determine by the change in the local static electric field at said sensors caused by the proximity of a round the time of closest approach of said round to the associated sensor and to determine angle of arrival from the time difference of arrival of the round at selected pairs of electric field sensors.

17. The apparatus of claim 16, wherein said array is a rectilinear array.

18. The apparatus of claim 17, wherein said array is a square array.

19. The apparatus of claim 16, wherein different pairs of sensors are used to compute angle of arrival, each resulting in an angle of arrival in different separate channels, and wherein said processor averages the results in each channel and compares the averaged results to an associated standard deviation, such that when the averaged results are within a predetermined standard deviation the presence of a round is declared as well as the direction of the trajectory of said round.

20. The apparatus of claim 16, and further including a display of the direction of said incoming round.

* * * * *